(No Model.) 2 Sheets—Sheet 1.
J. RITTY.
MACHINE FOR HULLING GREEN CORN.
No. 395,997. Patented Jan. 8, 1889.
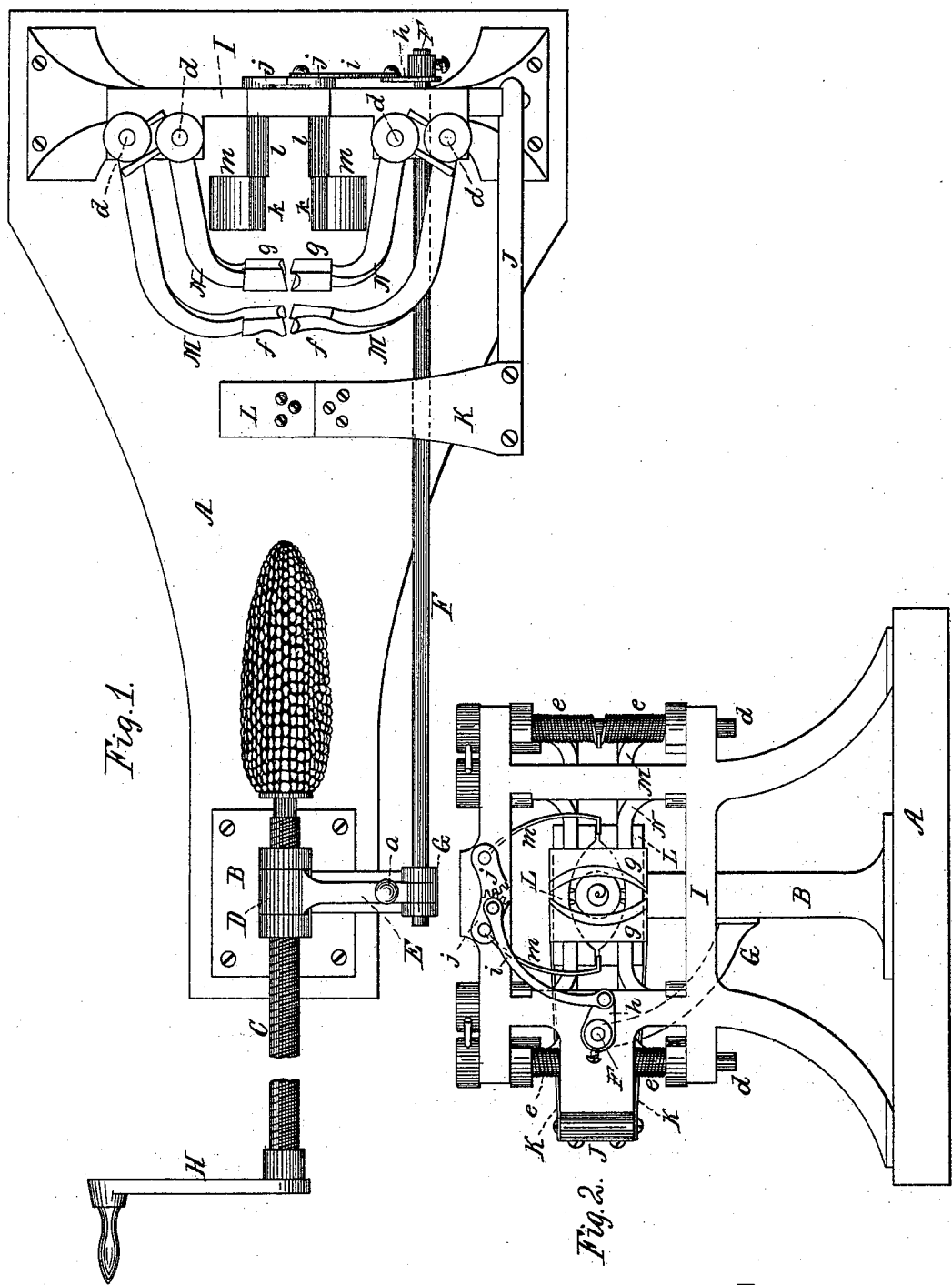
Witnesses:
W. C. Jirdinston.
Charles Billon
Inventor:
John Ritty
by Peck & Rector
his Attorneys.

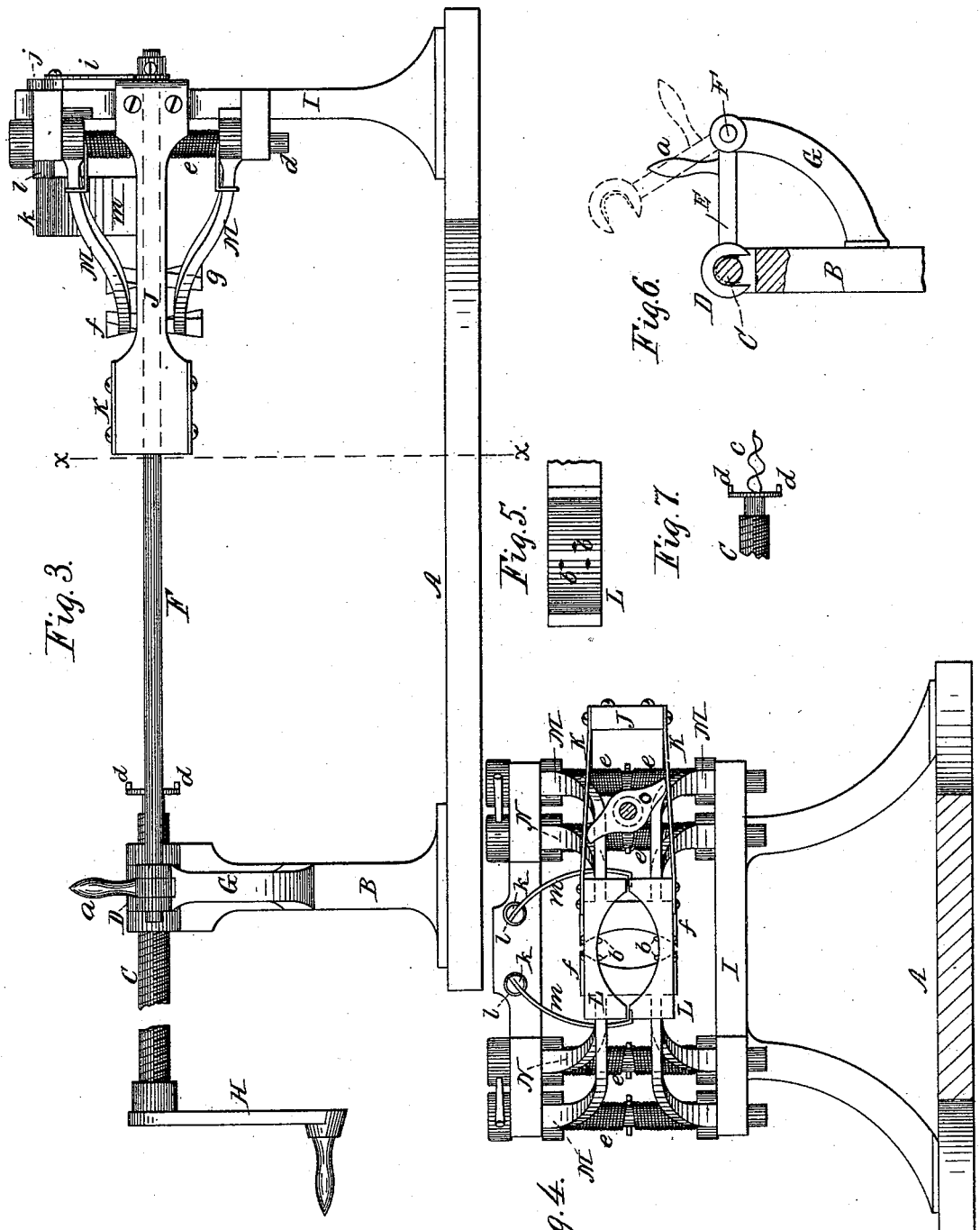

UNITED STATES PATENT OFFICE.

JOHN RITTY, OF DAYTON, OHIO.

MACHINE FOR HULLING GREEN CORN.

SPECIFICATION forming part of Letters Patent No. 395,997, dated January 8, 1889.

Application filed September 19, 1887. Serial No. 250,124. (No model.)

*To all whom it may concern:*

Be it known that I, JOHN RITTY, a citizen of the United States, residing at Dayton, in the county of Montgomery and State of Ohio, have invented a certain new and useful Machine for Hulling Green Corn, of which the following is a specification, reference being had to the accompanying drawings, forming a part thereof.

My invention has for its object to provide an improved apparatus for hulling green corn in the ear, whereby the entire hulls of the grain, or bran, are left upon the cob and the meats extracted therefrom for culinary purposes.

The novelty of my invention will be herein set forth, and specifically pointed out in the claims.

By reference to the accompanying drawings one form of machine for carrying out my invention may be thus described.

Figure 1, Sheet 1, is a plan view of a machine embodying my invention. Fig. 2, Sheet 1, is a rear elevation of the same. Fig. 3, Sheet 2, is a side elevation of the same. Fig. 4, Sheet 2, is a front elevation, in section, through the dotted line $xx$ of Fig. 3. Fig. 5, Sheet 2, is a detail plan view of one of the jaws carrying the knives for slitting the kernels. Fig. 6, Sheet 2, is a detail of the adjustable nut. Fig. 7, Sheet 2, is a detail of the end of the screw, showing the means for attaching the ear of corn.

The same letters of reference are used to indicate identical parts in all the figures.

A represents any suitable base, upon which is mounted at its front end a standard, B, through the forked top of which slides loosely a screw-threaded shaft, C, with which the screw-threaded half-nut D engages when in the position shown in full lines, Fig. 6. This half-nut D is mounted on an arm, E, rigidly keyed or otherwise secured upon a shaft, F, taking its bearings in the bracket-arm G, extended out from the standard B, and preferably in such position as to engage the screw-shaft C when swung down at a point between the forks of the standard B. The arm E may be provided with an operating-handle, $a$, for raising or lowering the half-nut for throwing it out of or into engagement with the screw-shaft C. The screw-shaft C may be operated by power or by a crank-handle, H.

At the opposite end of the base, at a proper distance and arranged transversely across the same, is an upright frame, I, to one side of which is secured a forwardly-extending arm, J, to which, by means of yielding spring-connections K, the jaws L are secured. In this instance these jaws are represented as blocks, with their contiguous or inner surfaces concave to form an oval opening in line with the screw-shaft C. These jaws are provided with knives or cutting-points $b$, arranged to cut transversely to the line of movement of the ear and extending into the opening before referred to, through which opening the ear of corn is propelled and rotated by the screw-shaft C, whose end is provided in this instance with a corkscrew, $c$, and retaining-points $d$, for firmly securing the ear of corn thereto.

Pivoted to the frame I in any suitable manner—in this instance upon shafts $d$, journaled therein and carrying coiled springs $e$—are two sets of converging pressing-jaws, M N, with which the springs $e$ engage to hold them together in working position, and whose inner ends are provided with presser-blocks $f g$. These presser-blocks are inclined and their operative faces set to the pitch of a screw, said faces being made concave to form oval openings, preferably at right angles to the oval openings of the jaws L and in line with the screw-shaft C.

The front surfaces of the blocks $f$ are made of the shape shown in order to present the working-edges of the same to the corn in the most advantageous manner.

The shaft F has its rear end journaled in the frame I, and has secured upon its rear end a crank, $h$, connected by a link, $i$, to intermeshing segment-gears $j$, secured upon the ends of shafts $k$, journaled in tubular bearings $l$, extending from the upper cross-piece of the frame I. These shafts $k$ are provided with pendent spring grappling-jaws $m$, which are thrown open and out of the way when the half-nut D is in engagement with the screw C, and which are thrown in by the disengagement of the half-nut and the consequent partial rotation of the shaft F, as will be readily understood. The shaft F passes between the arms K, and is provided with a cam, O, Fig. 4, so set that when the half-nut is in engagement with the screw the jaws L are nearest together, and when the half-nut is thrown out of engagement the said jaws are spread apart by the action of said cam upon the arms K.

The operation of extracting the meats of the grains from the hulls is as follows: The ears of green corn are first steamed or boiled sufficiently to partially solidify the milky pulp inclosed within the hulls and constituting the meats of the grains, and in this condition are passed through the machine in the following manner: By disengaging the half-nut D the screw-shaft C can be drawn back to the proper distance for the insertion and attachment of the ear of corn. It can then be pushed forward until the tip of the ear of corn reaches the opening between the jaws L. The half-nut is then engaged with the screw, and the latter is turned to rotate the ear of corn and propel it on through the opening between the said jaws, where the knives or points $b$ cut spirally through the outer ends of the grains, and thereby slit and open the ends of the hulls enveloping the meats without cutting off any portion of them. The continued rotation of the screw-shaft C propels the ear of corn with its opened hulls on through the openings between the pressing-jaws $f f g g$, by means of which the meats are entirely pressed out of the hulls and fall into any suitable receptacle placed to receive them. When all the meats have been thus extracted, the half-nut is disengaged, whereupon the cob with the hulls left upon it is caught by the grappling-jaws $m$, the screw-shaft C rotated in an opposite direction and disconnected from it, and then pulled back to receive a fresh ear, the cob held by the jaws being released by the re-engagement of the half-nut with the rod $c$. In this manner all the meats are extracted from the hulls and the latter remain upon the cob. By first steaming or boiling the corn upon the cob all the milk and juices of the grain are preserved intact, and the entire meats are readily expressed from the hull when the ear is passed through the machine, while their flavor is richer and they are rendered more palatable as an article of food than if the entire cooking were done after the contents of the grains had been expressed from the hulls. Furthermore, by the steaming of the corn the hulls of the grains are toughened, which renders them less liable to be torn from the cob while the meats are being expressed.

I am aware that it is not new to hull green corn in the ear by passing the ear through cutting and pressing devices, whereby the outer ends of the grains are cut off and the milk and juices expressed from the hulls, as shown and described, for instance, in Patent No. 103,543, to Barker, May 31, 1870, and I do not wish to be understood as claiming such construction, broadly.

I claim as my invention and desire to secure by Letters Patent of the United States—

1. In a machine for hulling green corn, the combination, with a rotary screw-threaded ear-carrying shaft and a nut engaging the same, of stationary spring-pressed cutter-jaws provided with cutting-points for splitting the kernels transversely of the cob and spring-pressed inclined presser-jaws set spirally opposite the pitch of the screw of the ear-carrying shaft for forcing the meats out through the slits formed by the cutting-points, substantially as described.

2. In a machine for hulling green corn, the combination, with the rotary forwardly-progressing ear-carrying shaft, gearing engaging the same to cause its forward movement, and the cutting-knives and presser-jaws, of grappling-jaws connected to the shaft-gearing, whereby they will grasp the cob during the return movement of the shaft and automatically release the same upon the engagement of the gearing for moving the shaft forward, substantially as described.

3. In a machine for hulling green corn, the combination, with the cutting-knives and pressing-jaws and ear-carrying shaft having the screw for engaging the ear, of grappling-jaws for positively holding the cob when passed through the cutting and pressing devices and preventing its backward rotation, whereby the screw on said shaft may be disengaged from the cob, substantially as described.

4. In a machine for hulling green corn, the combination, with the cutting-knives and pressing-jaws, the screw-threaded ear-carrying shaft having the screw for engaging the ear, and the half-nut engaging said shaft, of grappling-jaws for positively holding the cob when passed through the cutting and pressing devices and preventing its backward rotation, whereby when said nut is disengaged from the shaft the latter may be rotated and the screw withdrawn from the cob held by said grappling-jaws, substantially as described.

5. In a machine for hulling green corn, the combination, with the cutting and pressing devices, the screw-threaded ear-carrying shaft having the screw for engaging the ear, and the half-nut engaging said shaft, of grappling-jaws for holding the cob when passed through the cutting and pressing devices and a shaft connecting said jaws and half-nut, whereby when the latter is released from the shaft the jaws will be caused to close and grasp the cob, substantially as and for the purpose set forth.

6. In a machine for hulling green corn, the combination, with the knives for cutting the kernels and the ear-carrying shaft, of a shaft and operating mechanism, substantially as described, connecting the knives and the gearing of the ear-carrying shaft, for causing the separation of said knives during the disengagement of said gearing and the return movement of the shaft, substantially as described.

7. In a machine for hulling green corn, the combination, with the knives for cutting the kernels, the screw-threaded ear-carrying shaft, and the half-nut engaging the same, of a shaft connecting said knives and nut, whereby when the nut is disengaged from the shaft the knives will be separated to prevent their engagement with the shaft during its return movement, substantially as described.

8. In a machine for hulling green corn, the combination, with the knives for cutting the kernels, the screw-threaded ear-carrying shaft having the screw for engaging the ear, the half-nut engaging the shaft, and the jaws for grasping the cob after being passed through the knives, of a shaft connecting the half-nut, knives, and grappling-jaws, whereby when the nut is disengaged from the shaft the knives will be opened and the grappling-jaws closed to effect the release of the shaft from the cob and its return to first position, substantially as described.

9. In a machine for hulling green corn, the combination, with the cutting-knives carried by the flat springs K K, the screw-threaded ear-carrying shaft having the screw for engaging the ear, the half-nut engaging the shaft, and the jaws for grasping the cob after being passed through the knives, of a shaft, F, on which the half-nut is mounted, said shaft carrying a cam located between said springs K K, and being connected to the grappling-jaws for operating the latter, whereby when the half-nut is disengaged from the ear-carrying shaft the shaft F will be rotated, the knives separated by the cam, and the grappling-jaws closed, permitting the disengagement of the shaft from the cob and its return to first position, as set forth.

10. In a machine for hulling green corn, the combination, with the cutting-knives, the screw-threaded ear-carrying shaft, the half-nut engaging said shaft, and the jaws connected by gear-teeth for grasping the cob after it has passed between the knives, of a shaft on which said nut is mounted, having a crank-arm thereon, and a link connecting the crank-arm and one of said grappling-jaws, whereby said jaws will be separated upon the disengagement of the nut with its shaft and the consequent rotation of the shaft upon which it is mounted, substantially as described.

11. In a machine for hulling green corn, the combination, with the yielding cutter-jaws L, provided with cutting-points $b$, of the yielding presser-jaws M N, provided with the spirally-set presser-blocks $f\ f\ g\ g$, substantially as and for the purpose described.

JOHN RITTY.

Witnesses:
 L. K. TORBET,
 W. C. JIRDINSTON.